US012754370B2

(12) United States Patent
Tambasco et al.

(10) Patent No.: US 12,754,370 B2
(45) Date of Patent: Oct. 6, 2026

(54) BILAYER PHOTONIC ADIABATIC 2×2 SPLITTER

(71) Applicant: Cisco Technology, Inc., San Jose, CA (US)

(72) Inventors: Jean-Luc J. Tambasco, Macungie, PA (US); Dominic F. Siriani, Lansdale, PA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 18/510,526

(22) Filed: Nov. 15, 2023

(65) Prior Publication Data

US 2025/0155639 A1 May 15, 2025

(51) Int. Cl.
*G02B 6/126* (2006.01)
*G02B 6/122* (2006.01)

(52) U.S. Cl.
CPC .......... *G02B 6/126* (2013.01); *G02B 6/1228* (2013.01)

(58) Field of Classification Search
CPC ... G02B 6/12002; G02B 6/126; G02B 6/1228
See application file for complete search history.

(56) References Cited

U.S. PATENT DOCUMENTS

| | | | | |
|---|---|---|---|---|
| 2014/0086522 | A1 | 3/2014 | Adams | |
| 2017/0052315 | A1 * | 2/2017 | Barwicz | G02B 27/283 |
| 2017/0315294 | A1 | 11/2017 | Socci et al. | |
| 2019/0258002 | A1 | 8/2019 | Shi et al. | |
| 2020/0158952 | A1 | 5/2020 | Ma | |
| 2021/0278610 | A1 | 9/2021 | Li et al. | |
| 2023/0146759 | A1 | 5/2023 | Tambasco | |

* cited by examiner

*Primary Examiner* — Michael P Mooney
(74) *Attorney, Agent, or Firm* — Patterson + Sheridan, LLP

(57) ABSTRACT

Adiabatic splitters are disclosed. In one aspect, an adiabatic splitter includes a first waveguide and a second waveguide spaced from the first waveguide by a gap. The second waveguide has a first layer and a second layer. In a first stage of the adiabatic splitter, the first and second waveguides converge toward one another and the first and second layers are in a stacked arrangement. In a second stage of the adiabatic splitter, the second layer tapers and translates so that the first and second layers are no longer in the stacked arrangement at least at an output of the adiabatic splitter.

16 Claims, 6 Drawing Sheets

BILAYER PHOTONIC ADIABATIC 2×2 SPLITTER

TECHNICAL FIELD

Embodiments presented in this disclosure generally relate to photonic components. More specifically, embodiments disclosed herein relate to adiabatic splitters.

BACKGROUND

Adiabatic splitters, such as adiabatic 2×2 3 dB splitters, are photonic components used to split or cross optical signals. Adiabatic splitters can be implemented in a number of applications, including switches, modulators, interfometers, etc. As one example, an adiabatic 2×2 3 dB splitter can be used as an input and/or an output splitter of a photonic switch. Further, adiabatic splitters can be used as standalone devices. Generally, adiabatic splitters are desired to be minimal loss, compact, and fabrication tolerant. Adiabatic splitters are also designed to have a precise split ratio. Improvements to these metrics are desirable as improved optical performance, packaging, and/or manufacturability can result.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
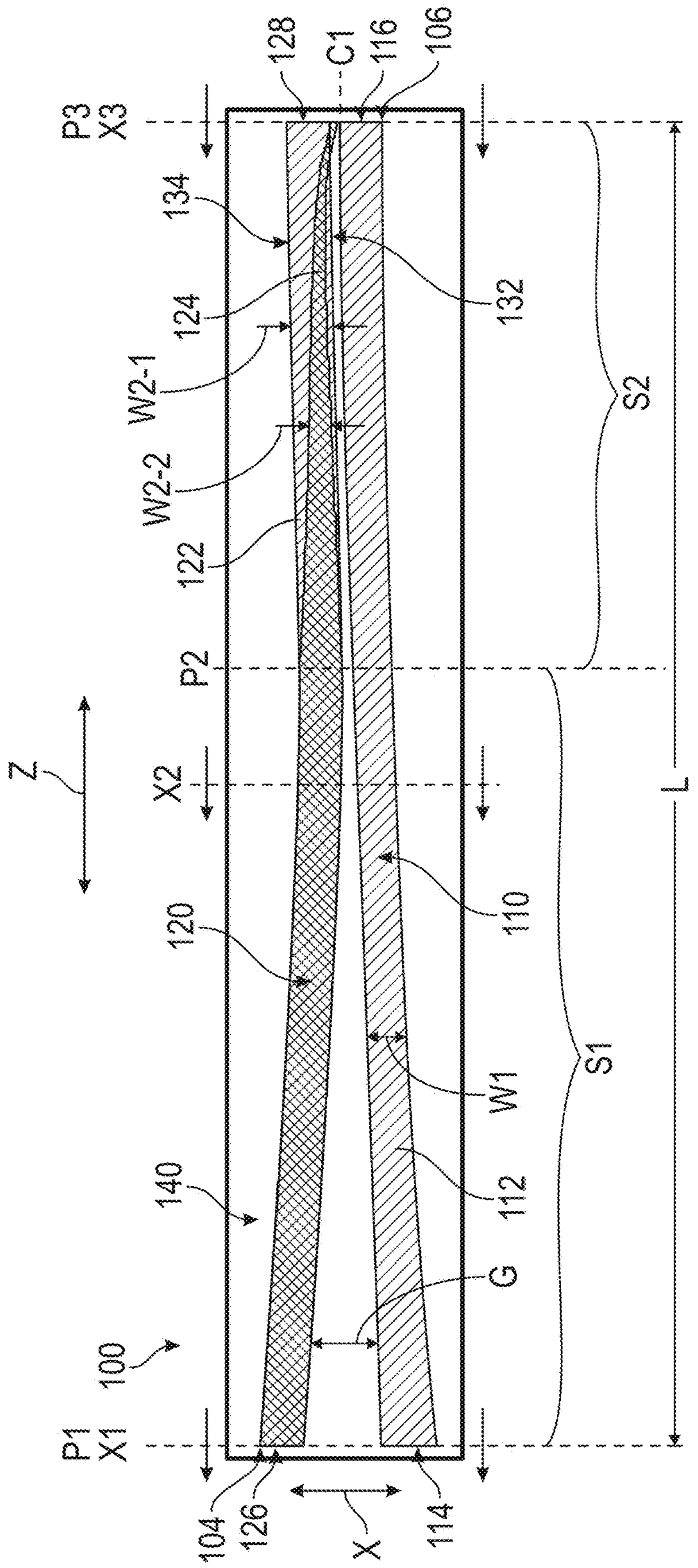
FIG. 1 is a top view of an adiabatic splitter according to one embodiment of the present disclosure.

One embodiment presented in this disclosure is an adiabatic splitter. The adiabatic splitter includes a first waveguide and a second waveguide spaced from the first waveguide by a gap. The second waveguide has a first layer and a second layer. In a first stage of the adiabatic splitter, the first and second waveguides converge toward one another and the first and second layers are in a stacked arrangement. In a second stage of the adiabatic splitter, the second layer tapers and translates so that the first and second layers are, at least at an output of the adiabatic splitter, no longer in the stacked arrangement.

Another embodiment presented in this disclosure is a crossover adiabatic splitter. The crossover adiabatic splitter includes a first region, a second region, a first waveguide traversing through the first region and the second region, and a second waveguide traversing through the first region and the second region. In the first region, the first waveguide has a first layer and the second waveguide has a first layer and a second layer. The first waveguide and the second waveguide converge toward one another over a first stage of the first region and the second layer and the first layer of the second waveguide traverse through the first stage in a stacked arrangement, and in a second stage of the first region, the second layer tapers and translates. In the second region, the second layer inverse tapers and translates over a third stage of the second region, and in a fourth stage of the second region, the first layer of the first waveguide and the first layer of the second waveguide diverge from one another and the second layer and the first layer of the first waveguide traverse through the fourth stage in a stacked arrangement.

A further embodiment presented in this disclosure is an adiabatic splitter. The adiabatic splitter includes a first waveguide and a second waveguide spaced laterally from the first waveguide by a gap. The second waveguide has a first layer and a second layer. With the first and second layers in a vertically stacked arrangement, the first and second waveguides laterally converge toward one another over a first portion of a longitudinal length of the adiabatic splitter. Over a second portion of the longitudinal length of the adiabatic splitter, the second layer tapers in width and translates so as to laterally cross an inner edge or an outer edge of the first layer.

Example Embodiments

Various embodiments of adiabatic splitters are disclosed herein that can provide improved optical performance, packaging, and/or manufacturability over conventional adiabatic splitters. The disclosed adiabatic splitters can be used as standalone devices or can be implemented into various products, including, without limitation, switches (e.g., thermos-optic switches), modulators, interfometers, other FR4 standard products, Co-Packaged Optics (CPO) applications, etc., and can be used in receiver, transmitter, and/or transceiver applications.

In one example aspect, an adiabatic 2×2 3 dB splitter with a 50:50 split ratio is disclosed. The adiabatic splitter has two waveguides, including a first waveguide and a second waveguide. Each waveguide has an inlet port and an outlet port; hence, the 2×2 configuration. The first waveguide includes a single layer while the second waveguide includes two layers, including a first layer and a second layer. Along a first stage of the adiabatic splitter, the first waveguide and the second waveguide approach one another. Specifically, the first waveguide and the second waveguide laterally converge toward one another in the first stage, e.g., to enable optical coupling of the first and second waveguides. In the first stage, the first and second layers of the second waveguide are in a stacked arrangement and, in one embodiment, both have a same width, which can be fixed in the first stage. The single layer of the first waveguide can taper slightly in the first stage. Notably, in the first stage, the second waveguide has a different effective refractive index than the first waveguide due to the stacked layers of the second waveguide.

That is, the incoming light in the second waveguide experiences a greater impedance than in the first waveguide. The thicker refractive index of the second waveguide prevents light from jumping from the second waveguide to the first waveguide, or rather, prevents light scattering. Light traversing through the first waveguide is phase-mismatched with respect to light traversing through the second waveguide. The unique arrangement of the second waveguide in the first stage allows for the first and second waveguides to rapidly approach one another without or with minimal light scatter, compared to conventional designs. In this regard, such an adiabatic splitter can be made with a shorter longitudinal length, which results in the use of less material and better packaging, which is particularly beneficial for forward-looking applications, such as CPO applications. Moreover, the stacked arrangement does not extend the lateral footprint of the adiabatic splitter.

Once the first and second waveguides meet or approach one another, e.g., at a coupling region, the second layer of the second waveguide begins to taper and translate in a second stage of the adiabatic splitter. In the second stage, the single layer of the first waveguide and the first layer of the second waveguide can have substantially fixed widths and a constant or substantially constant edge-to-edge lateral separation between them. The second layer of the second waveguide can taper in width and translate so that, at least at the output of the adiabatic splitter, the second layer is no longer in a stacked arrangement with the first layer of the second waveguide. As one example, the second layer can taper in width and translate toward a center of the adiabatic splitter, e.g., so that a tip of the second layer is positioned laterally between the first waveguide and the second layer of the second waveguide. As another example, the second layer can taper in width and translate away from the center of the adiabatic splitter, e.g., to a position laterally outward of an outer edge of the first layer of the second waveguide. Accordingly, the second layer of the second waveguide tapers and translates so that, after facilitating a refractive index differential between the first and second waveguides in the first stage, the second layer "disappears" so that photonic symmetry can be achieved at the output of the adiabatic splitter, or rather, so that a 50:50 split (or near 50:50 split) can be achieved.

Accordingly, such an adiabatic splitter can advantageously have improved optical performance, packaging, and/or manufacturability over conventional adiabatic splitters. Specifically, minimal loss can be achieved due to the refractive index differential of the first and second waveguides in the first stage, which also allows for the adiabatic splitter to be fabricated shorter in length because the first and second waveguides can more rapidly approach one another. Further, because of the stacked arrangement and resulting refractive index differential between the first and second waveguides, the waveguides can be made of the same material, which can reduce manufacturing complexity. Also, the tapering and translating of the second layer of the second waveguide to make the second layer "disappear" can facilitate a precise splitting ratio at the output of the adiabatic splitter despite the multilayer stacked arrangement of the second waveguide in the first stage.

In yet another example aspect of the present disclosure, a crossover adiabatic splitter is disclosed. The crossover adiabatic splitter can be constructed with two adiabatic splitters having the same topology as described above but arranged in a face-to-face or mirrored configuration so as to enable an optical crossover, such as crossover of two different Transverse Electric (TE) signals or crossover of a TE signal and a Transverse Magnetic (TM) signal, among other possibilities. The same or similar advantages set forth above are applicable to the crossover adiabatic splitter.

Example embodiments of adiabatic splitters and crossover adiabatic splitters are provided below.

Figure 2:
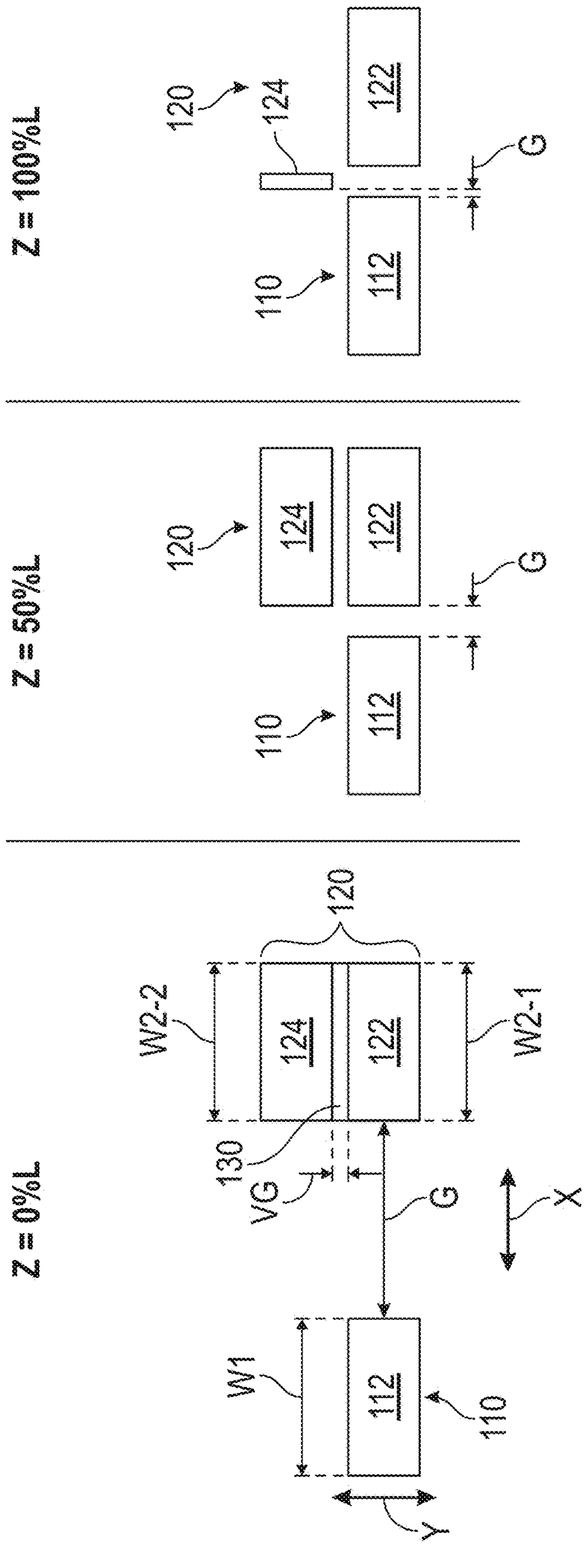
FIG. 2 depicts various cross-sectional views of the adiabatic splitter of FIG. 1.

With reference now to FIGS. 1 and 2, an adiabatic splitter 100 according to one embodiment of the present disclosure is depicted. Particularly, FIG. 1 illustrates a top view of the adiabatic splitter 100 and FIG. 2 depicts various cross-sectional views of the adiabatic splitter 100 at various longitudinal cross sections. For reference, the adiabatic splitter 100 defines a longitudinal direction Z, a lateral direction X, and a vertical direction Y (FIG. 2). The longitudinal direction Z, the lateral direction X, and the vertical direction Y are mutually perpendicular to one another and form an orthogonal direction system. The adiabatic splitter 100 has a length L, a first stage S1 extending along a first portion of the length L, and a second stage S2 extending along a second portion of the length L. The second stage S2 is adjacent to the first stage S1 as shown in FIG. 1. Moreover, in FIG. 1, various longitudinal cross sections are shown, including a first longitudinal cross section X1 (at 0% of the length of the adiabatic splitter 100), a second longitudinal cross section X2 (at 50% of the length of the adiabatic splitter 100), and a third longitudinal cross section X3 (at 100% of the length of the adiabatic splitter 100). Cross sections of the adiabatic splitter 100 are shown in FIG. 2 at the first longitudinal cross section X1, the second longitudinal cross section X2, and the third longitudinal cross section X3, with all views taken along their respective lines in FIG. 1. The adiabatic splitter 100 has an input 104 and an output 106.

The adiabatic splitter 100 depicted in FIGS. 1 and 2 is configured as an adiabatic 2×2 3 dB splitter with 50:50 splitting. As shown, the adiabatic splitter 100 includes a first waveguide 110 and a second waveguide 120. The first waveguide 110 has a first layer 112, which is the only layer of the first waveguide 110. Consequently, for this example embodiment, the first waveguide 110 is a single-layer waveguide. The second waveguide 120 is spaced from the first waveguide 110 by a gap G, or lateral gap, which varies over the length L of the adiabatic splitter 100. The second waveguide 120 has a first layer 122 and a second layer 124. In this regard, the second waveguide 120 is a bilayer waveguide. The second layer 124 is spaced from the first layer 122, e.g., by a vertical gap VG as shown in FIG. 2, which can be filled by a layer 130 (e.g., a $SiO_2$ layer). The thickness of the layer 130 can be 100 nanometers, for example. In alternative embodiments, the second layer 124 can be positioned directly adjacent the first layer 122, such as directly on top of the first layer 122. The first waveguide 110 has an inlet port 114 and an outlet port 116. Similarly, the second waveguide 120 has an inlet port 126 and an outlet port 128. The first waveguide 110 and the second waveguide 120 can both be formed of silicon nitride (SiN), for example. The first and second waveguides 110, 120 can be disposed within or on a platform 140, e.g., a silicon oxide platform (e.g., $SiO_2$).

The first layer 112 of the first waveguide 110 has a width W1 (e.g., a lateral width). In some embodiments, the width W1 of the first layer 112 can vary along the length L of the adiabatic splitter 100. For instance, the width W1 of the first layer 112 can be 900 nanometers at the inlet port 114 and can taper to 700 nanometers as the first layer 112 extends along the longitudinal direction Z toward the outlet port 116. In some embodiments, the width W1 of the first layer 112 can remain constant over the length L of the adiabatic splitter 100. The first layer 112 can each have a vertical thickness of 250 nanometers, for example.

Further, the first layer 122 of the second waveguide 120 has a width W2-1 (e.g., a lateral width). In some embodiments, the width W2-1 of the first layer 122 can vary or remain constant along the length L of the adiabatic splitter 100. In some embodiments, the width W2-1 of the first layer 122 can be 700 nanometers. The second layer 124 of the second waveguide 120 has a width W2-2 (e.g., a lateral width). As will be explained below, the width W2-2 of the second layer 124 can track with the width W2-1 of the first layer 122 over a first portion of the length L of the adiabatic splitter 100 but can taper over a second portion of the length L. In some embodiments, the width W2-1 of the first layer 122 and the width W2-2 of the second layer 124 can both be 700 nanometers over the first portion of the length L (e.g., over the first stage S1). The first layer 122 and the second layer 124 can each have a vertical thickness of 250 nanometers, for example.

With respect to the first stage S1 of the adiabatic splitter 100, the first waveguide 110 and the second waveguide 120 converge toward one another (e.g., laterally) along the first stage S1. That is, in the first stage S1, the first and second waveguides 110, 120 converge laterally toward one another as they extend along longitudinal direction Z from an inlet plane P1 to a reference plane P2. The reference plane P2 is orthogonal to the longitudinal direction Z and is located along the length L of the adiabatic splitter 100 where the second layer 124 begins to taper. Accordingly, the gap G between the first waveguide 110 and the second waveguide 120 is greater at the inlet plane P1 than at the reference plane P2. Further, the first layer 122 and the second layer 124 of the second waveguide 120 have a same width along the first stage S1. That is, W2-1-W2-2 over the first stage S1. The widths W2-1, W2-2 of the first and second layers 122, 124 can be fixed over the first stage S1.

With respect to the second stage S2 of the adiabatic splitter 100, the width W2-2 of the second layer 124 tapers along the second stage S2. Stated another way, in the second stage S2, the second layer 124 of the second waveguide 120 tapers in width from the reference plane P2 to an outlet plane P3. The second layer 124 can taper in a non-linear manner along the second stage S2 as shown in FIG. 1. In addition to tapering, the second layer 124 can translate so that the first and second layers 122, 124 are no longer in the stacked arrangement at least at the output 106 of the adiabatic splitter 100. In this way, the photonic structure of the adiabatic splitter 100 can be symmetric at the output 106.

Unlike the second layer 124, the first layer 122 of the second waveguide 120 does not taper along the second stage S2. Rather, the width W2-1 of the first layer 122 of the second waveguide 120 remains substantially constant along the second stage S2. Moreover, the first layer 112 of the first waveguide 110 and the first layer 122 of the second waveguide 120 can have a substantially constant lateral edge-to-edge separation along the second stage S2. A width W1 of the first layer 112 of the first waveguide 110 can remain substantially constant along the first and second stages S1, S2, but can taper slightly in the first stage S1 as noted previously.

Further, for the depicted embodiment of FIGS. 1 and 2, the second layer 124 translates toward a center C1 of the adiabatic splitter 100 along the second stage S2. Particularly, the second layer 124 translates toward the center C1 of the adiabatic splitter 100 along the second stage S2 such that the second layer 124 is positioned between the first waveguide 110 and the first layer 122 of the second waveguide 120 at the output plane P3, e.g., along the lateral direction X. The third cross-sectional view (e.g., where Z=100% L) in FIG. 2 shows the second layer 124 laterally positioned between the first waveguide 110 and the first layer 122 of the second waveguide 120. Stated another way, the second layer 124 translates so that, at the outlet plane P3, the second layer 124 is positioned laterally inward of an inner edge 132 of the first layer 122 of the second waveguide 120.

The arrangement of the adiabatic splitter 100 provides certain advantages, benefits, and/or technical effects. Particularly, the stacked arrangement of the second waveguide 120 enables the second waveguide 120 to have a different effective refractive index than the first waveguide 110, which prevents light scattering between the first and second waveguides 110, 120. Consequently, the first and second waveguides 110, 120 can approach one another in a more rapid manner than in conventional adiabatic splitters. In this regard, the adiabatic splitter 100 can be fabricated with a shorter longitudinal length L than conventional designs, which makes the adiabatic splitter 100 more compact and less material is needed. Moreover, the stacked arrangement of the first and second layers 122, 124 of the second waveguide 120 does not affect the lateral footprint of the adiabatic splitter 100. The tapering and translating of the second layer 124 of the second waveguide 120 facilitates a symmetric photonic structure at the output 106 of the adiabatic splitter 100, which enables a desired 50:50 split of optical signals.

Figure 3:
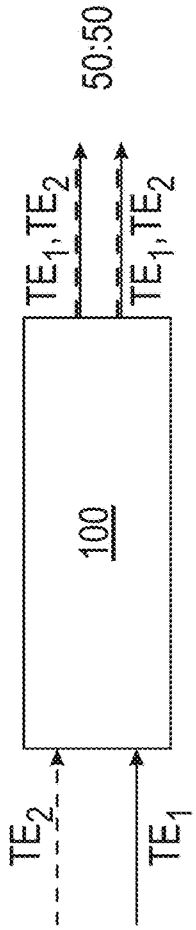
FIG. 3 is a schematic flow diagram depicting an example manner in which optical signals can be split by the adiabatic splitter of FIG. 1.
Figure 4:
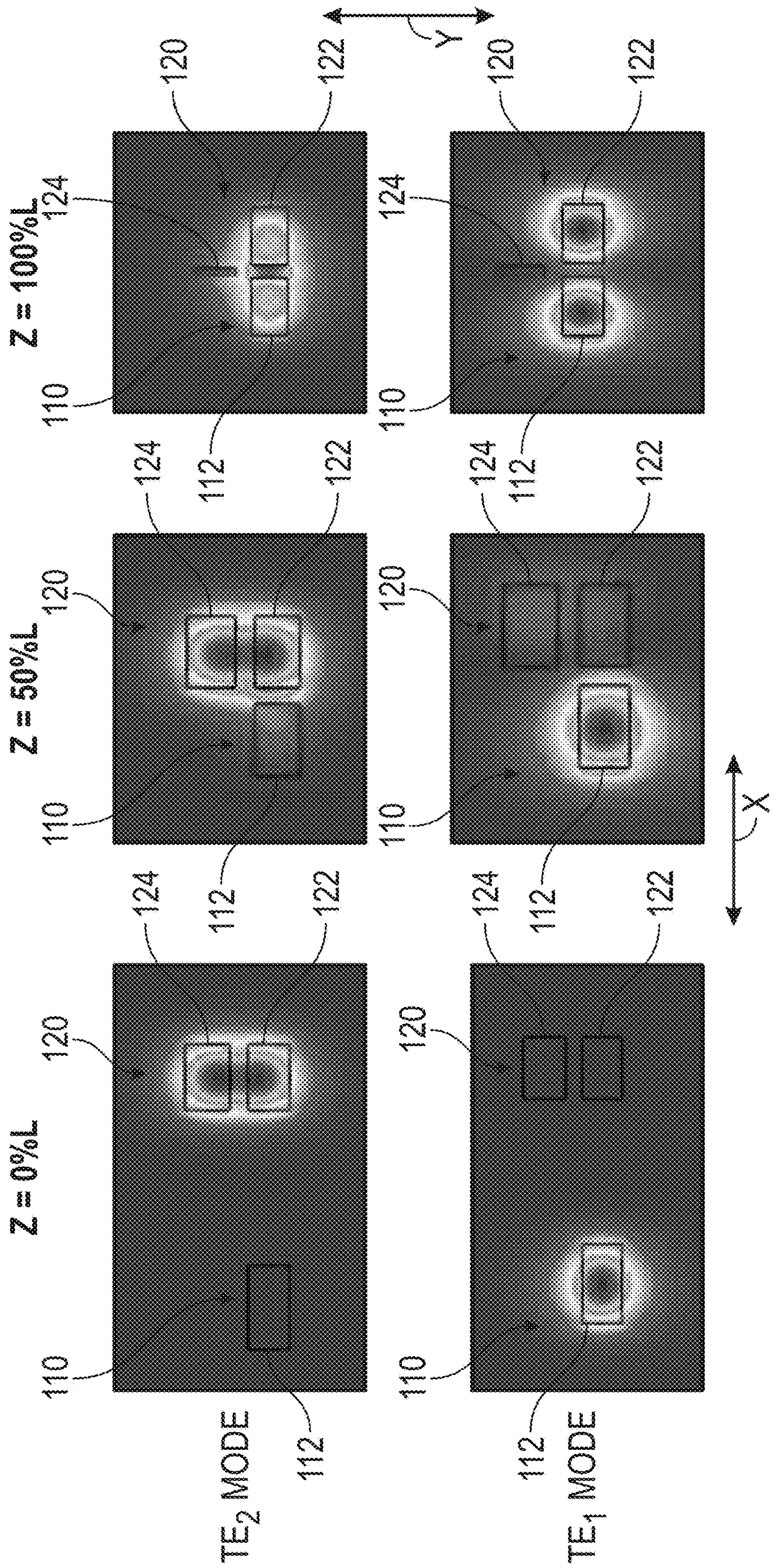
FIG. 4 illustrates a matrix of longitudinal cross-sections of the adiabatic splitter of FIG. 1 that demonstrate how the adiabatic splitter splits optical signals.

With reference now to FIGS. 3 and 4, an example manner in which optical signals can be split by the adiabatic splitter 100 will be provided. FIG. 3 is a schematic flow diagram depicting an example manner in which optical signals can be split by the adiabatic splitter 100. FIG. 4 illustrates a matrix of longitudinal cross-sections of the adiabatic splitter 100 that demonstrate how the adiabatic splitter 100 splits light, according to an example embodiment.

As shown in FIGS. 3 and 4, a first TE mode signal TE1 and a second TE mode signal TE2 enter the adiabatic splitter 100, e.g., through respective inlet ports of the first and second waveguides 110, 120. For instance, the first TE mode signal TE1 can enter the inlet port of the first waveguide 110 and the second TE mode signal TE2 can enter the inlet port of the second waveguide 120. As illustrated in FIG. 4, at the first longitudinal cross section X1 (or Z=0% L), the first TE mode signal TE1 is shown traversing through the first layer 112 of the first waveguide 110, but not through the first layer 122 or the second layer 124 of the second waveguide 120. Also, at the first longitudinal cross section X1, the second TE mode signal TE2 is shown traversing through the first and second layers 122, 124 of the second waveguide 120, but not through the first layer 112 of the first waveguide 110.

At the second longitudinal cross section X2 (or Z=50% L), the first TE mode signal TE1 is shown still traversing through the first layer 112 of the first waveguide 110, and the second TE mode signal TE2 is shown still traversing through the first and second layers 122, 124 of the second waveguide 120. Although the first and second waveguides 110, 120 have approached one another, the refractive indexes of the first and second waveguides 110, 120 have largely prevented light scatter between the first and second waveguides 110, 120. Accordingly, the light intensities of the optical signals at the second longitudinal cross section X2 are largely undiminished compared to their respective light intensities at the first longitudinal cross section X1.

At the third longitudinal cross section X3 (or Z=100% L), after undergoing optical coupling between the first and second waveguides 110, 120, the first TE mode signal TE1 is shown split 50:50 between the first layer 112 of the first waveguide 110 and the first layer 122 of the second waveguide 120. The first TE mode signal TE1 does not traverse through the second layer 124 of the second waveguide 120 at the third longitudinal cross section X3, enabling the 50:50 split at the output 106 or outlet ports 116, 128 of the adiabatic splitter 100. Further, the second TE mode signal TE2 is shown split 50:50 between the first layer 112 of the first waveguide 110 and the first layer 122 of the second waveguide 120. Like the first TE mode signal TE1, the second TE mode signal TE2 does not traverse through the second layer 124 of the second waveguide 120 at the third longitudinal cross section X3, enabling the 50:50 split at the output 106 or outlet ports 116, 128 of the adiabatic splitter 100.

Accordingly, the adiabatic splitter 100 outputs the first TE mode signal TE1 50:50 between the first waveguide 110 and the second waveguide 120 and the second TE mode signal TE2 50:50 between the first waveguide 110 and the second waveguide 120 as shown in FIGS. 3 and 4.

Figure 5:
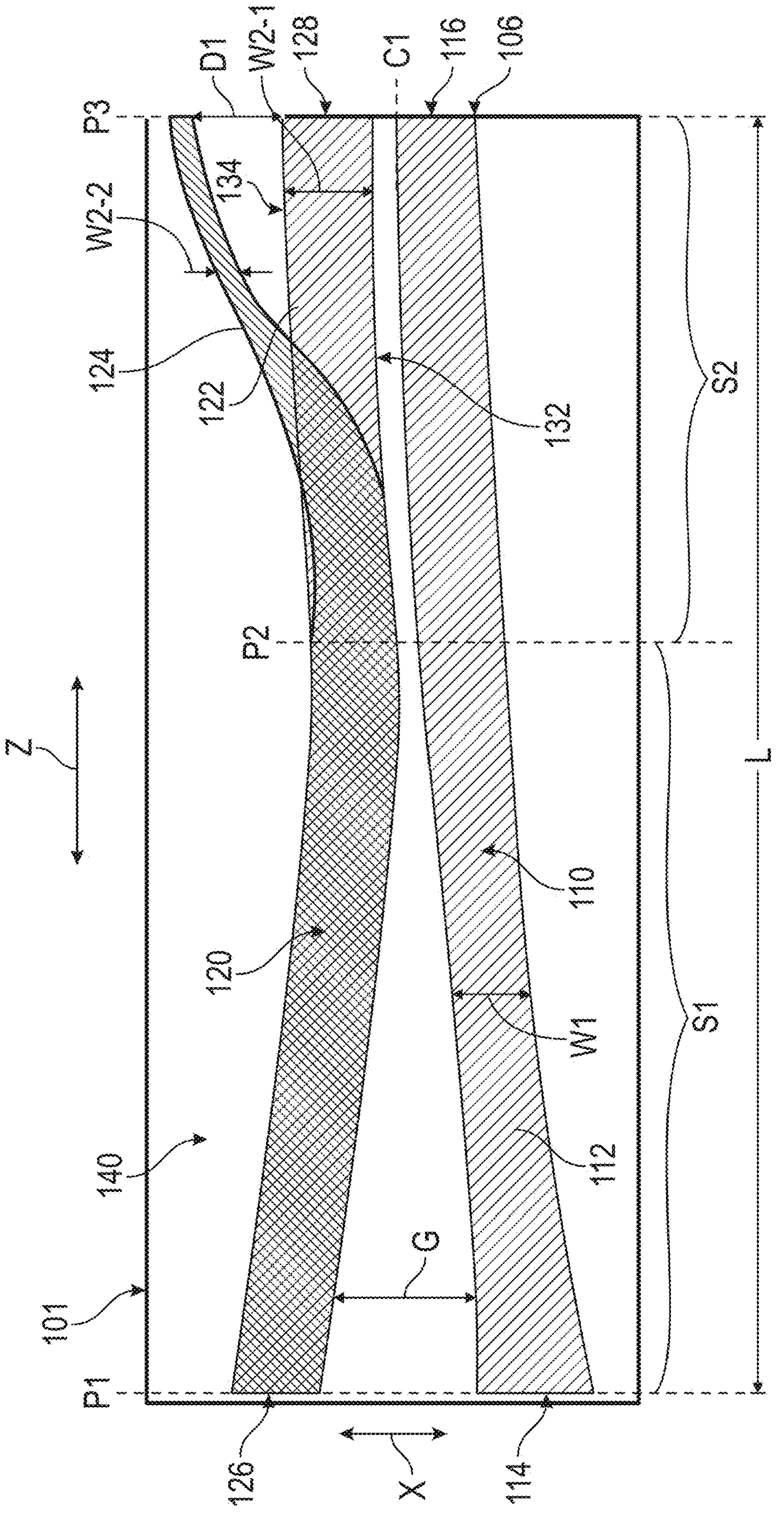
FIG. 5 is a top view of an adiabatic splitter according to another embodiment of the present disclosure.

FIG. 5 is a top view of an adiabatic splitter 101 according to an alternative embodiment of the present disclosure. The adiabatic splitter 101 is configured in a similar manner as the adiabatic splitter 100 of FIG. 1 except as provided below. For the depicted embodiment of FIG. 5, the second layer 124 translates away from the center C1 of the adiabatic splitter 101 along the second stage S2, or rather, so that the second layer 124 of the second waveguide 120 translates toward a side. Specifically, the second layer 124 translates so that, at the outlet plane P3, the second layer 124 is positioned laterally outward of an outer edge 134 of the first layer 122 of the second waveguide 120. In some embodiments, at the outlet plane P3, the second layer 124 is spaced a lateral distance D1 that is equal to or greater than the width W2-1 of the first layer 122 at the outlet plane P3. The translating of the second layer 124 in FIG. 5 can facilitate the "disappearance" of the second layer 124 in the second stage S2 and can facilitate the 50:50 split ratio at the output 106 of the adiabatic splitter 101. That is, the second layer 124 can be translated so that the tip of the second layer 124 is positioned far enough away from the center such that the second layer 124 has a negligible effect at the output.

Figure 6:
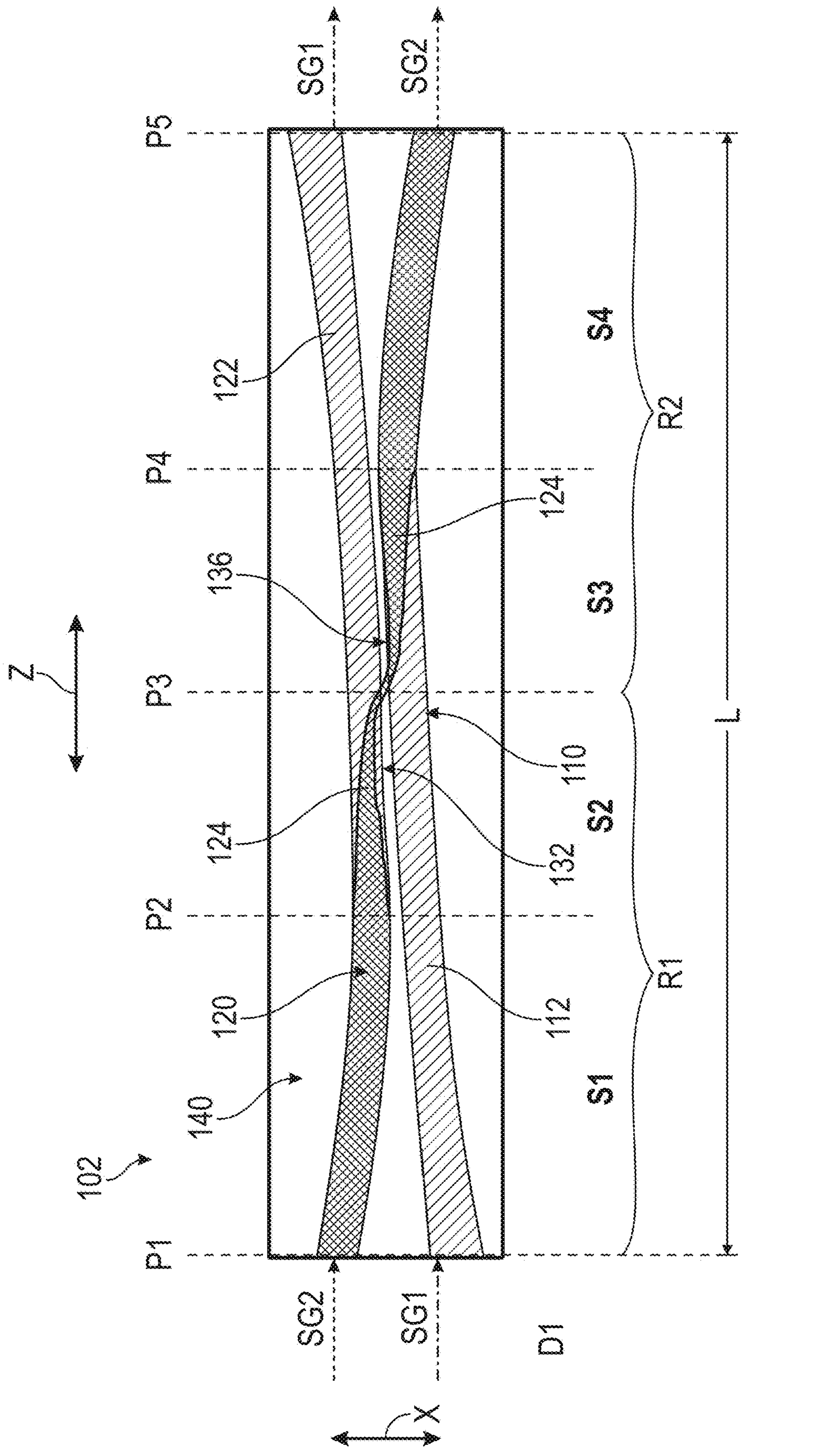
FIG. 6 is a top view of a crossover adiabatic splitter according to an embodiment of the present disclosure.

With reference now to FIG. 6, an example crossover adiabatic splitter 102 will now be described. FIG. 6 is a top view of the crossover adiabatic splitter 102 according to an embodiment of the present disclosure. Generally, the crossover adiabatic splitter 102 is constructed with two adiabatic splitters having the same topology as described above but arranged in a face-to-face or mirrored configuration so as to enable an optical crossover. More particularly, the crossover adiabatic splitter 102 has a first region R1 extending along a first portion of the length L and a second region R2 extending along a second portion of the length L. The second region R2 is adjacent to the first region R1 as shown in FIG. 6. The first region R1 of the crossover adiabatic splitter 102 is configured in a same manner as the adiabatic splitter 100 of FIG. 1. The second region R2 is configured in a same manner as the adiabatic splitter 100 of FIG. 1 except in a mirrored configuration. The first and second regions R1, R2 abut one another and are optically coupled. The first region R1 includes a first stage S1 and a second stage S2 and the second region R2 includes a third stage S3 and a fourth stage S4. Further, various reference planes are depicted in FIG. 6, including an input plane P1, a first region plane P2, a crossover plane P3, a second region plane P4, and an output plane P5.

In the first stage S1, the first waveguide 110 and the second waveguide 120 approach one another, e.g., as they extend along the longitudinal direction Z from the input plane P1 to the first region plane P2. The first layer 122 and the second layer 124 of the second waveguide 120 are in a stacked arrangement (i.e., the first and second layers 122, 124 are vertically stacked) and have a same width. The first layer 112 of the first waveguide 110 inverse tapers along the first stage S1, e.g., as the first layer 112 extends along the longitudinal direction Z.

In the second stage S2, the second layer 124 of the second waveguide 120 tapers in width, e.g., as the second layer 124 extends along the longitudinal direction Z from the first region plane P2 to the crossover plane P3. In this example embodiment, the second layer 124 tapers in a non-linear manner and translates toward a center of the crossover adiabatic splitter 102. The second layer 124 crosses the inner edge 132 of the first layer 122 and is positioned laterally between the first layer 122 of the second waveguide 120 and the first layer 112 of the first waveguide 110, e.g., at the crossover plane P3. The width of the first layer 122 of the second waveguide 120 remains constant or substantially constant along the second stage S2. Moreover, the first waveguide 110 and the first layer 122 of the second waveguide 120 can have a constant or substantially constant lateral edge-to-edge separation along the second stage S2. A width of the first layer 112 of the first waveguide 110 can remain substantially constant along the second stage S2.

In the third stage S3, and particularly at the crossover plane P3, the second layer 124 switches from tapering to inverse tapering to increase in width. The second layer 124 inverse tapers in a non-linear manner and translates to track with the first layer 112 of the first waveguide 110. The second layer 124 can inverse taper and translate so as to be positioned, at least in part, in a stacked arrangement with the first layer 112 of the first waveguide 110. Specifically, the second layer 124 crosses an inner edge 136 of the first layer 112 of the first waveguide 110 and inverse tapers to eventually match the width of the first layer 112 of the first waveguide 110 (eventually matching in width at the second region plane P4). In this regard, the second layer 124 essentially becomes a part of the first waveguide 110 in the second region R2. Consequently, in the third stage S3, the first waveguide 110 becomes a bilayer waveguide while the second waveguide 120 becomes a single layer waveguide. Moreover, the first layer 122 of the second waveguide 120 and the first layer 112 of the first waveguide 110 can have a constant or substantially constant lateral edge-to-edge separation along the third stage S3. A width of the first layer 122 of the second waveguide 120 can remain substantially constant along the third stage S3.

In the fourth stage S4, the first waveguide 110 and the second waveguide 120 diverge from one another, e.g., as they extend along the longitudinal direction Z from the second region plane P4 to the output plane P5. The first layer 112 and the second layer 124, which is now effectively a part of the first waveguide 110, have a same width, which can be fixed, and can traverse through the fourth stage S4 in the vertically stacked arrangement commenced in the third stage S3. The first layer 122 of the second waveguide 120 inverse tapers along the fourth stage S4, e.g., as the first layer 122 extends along the longitudinal direction Z. For the depicted embodiment of FIG. 6, the second layer 124 is a contiguous layer that extends continuously through the first and second regions R1, R2.

The crossover adiabatic splitter 102 of FIG. 6 can be used to "cross" a first optical signal SG1 and a second optical signal SG2. By way of example, as shown in FIG. 6, the first optical signal SG1 can be input into the inlet port of the first waveguide 110 and a second optical signal SG2 can be input into the inlet port of the second waveguide 120. The crossover adiabatic splitter 102 can "cross" the optical signals so that the first optical signal SG1 can be output from the outlet port of the second waveguide 120 and the second optical signal SG2 can be output from the outlet port of the first waveguide 110. The crossover of the optical signals SG1, SG2 can occur generally within the second and third stages S2, S3.

In some embodiments, the first and second optical signals SG1, SG2 can be first and second TE mode signals, respectively. Accordingly, in such embodiments, the first TE mode signal can be input into the inlet port of the first waveguide 110 and the second TE mode signal can be input into the inlet port of the second waveguide 120. The crossover adiabatic splitter 102 can cross the signals so that the first TE mode signal can be output from the outlet port of the second waveguide 120 and the second TE mode signal can be output from the outlet port of the first waveguide 110.

In other embodiments, the first and second optical signals SG1, SG2 can be TE mode signal and a transverse magnetic (TM) mode signal, respectively. Accordingly, in such embodiments, the TE mode signal can be input into the inlet port of the first waveguide 110 and the TM mode signal can be input into the inlet port of the second waveguide 120. The crossover adiabatic splitter 102 can cross the signals so that the TE mode signal can be output from the outlet port of the second waveguide 120 and the TM mode signal can be output from the outlet port of the first waveguide 110. Such an embodiment advantageously provides for low loss.

Figure 7:
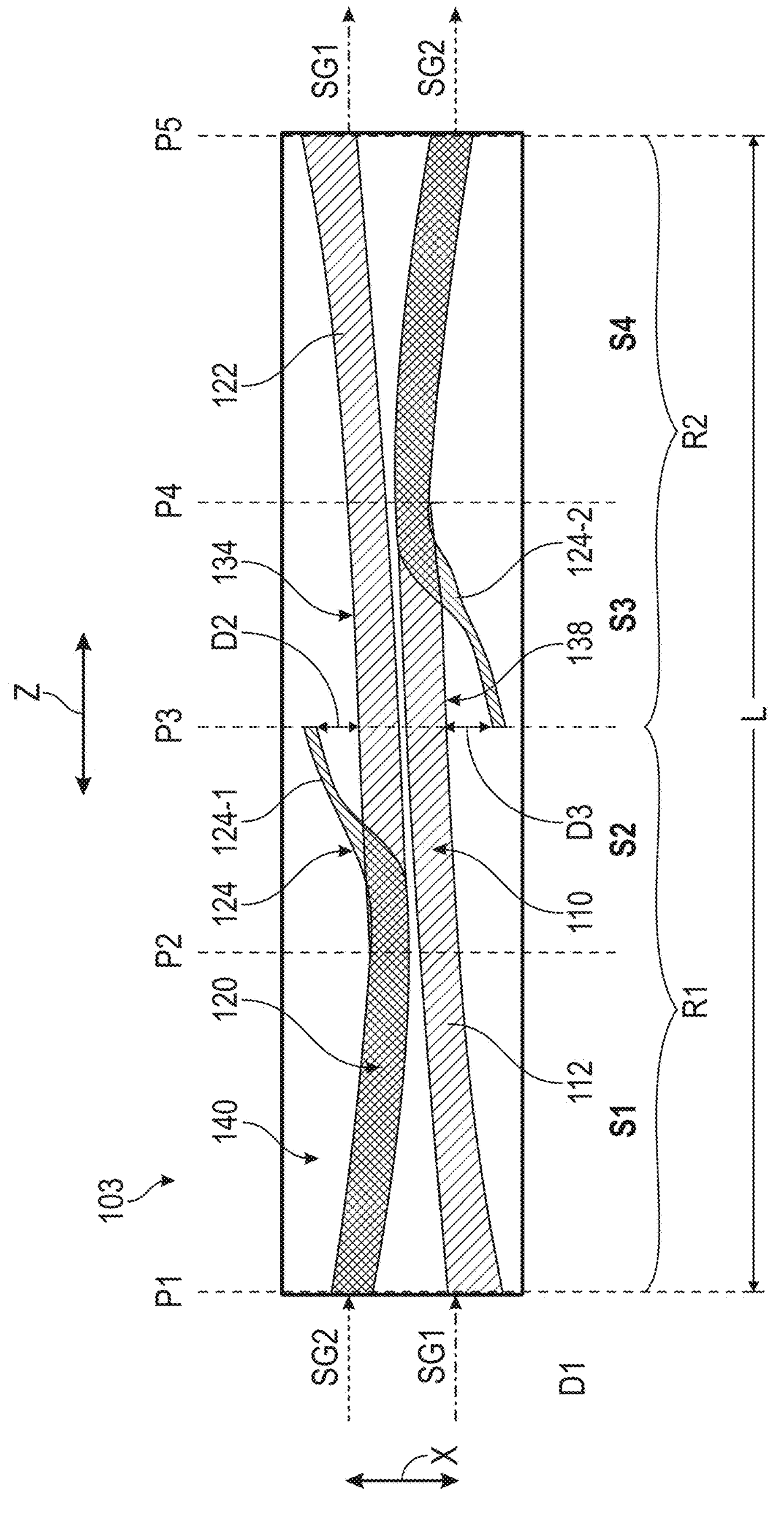
FIG. 7 is a top view of a crossover adiabatic splitter according to another embodiment of the present disclosure.

With reference now to FIG. 7, another example crossover adiabatic splitter 103 will now be described. FIG. 7 is a top view of the crossover adiabatic splitter 103 according to an alternative embodiment of the present disclosure. The crossover adiabatic splitter 103 is configured in a similar manner as the crossover adiabatic splitter 102 of FIG. 6 except as provided below.

For the illustrated embodiment of FIG. 7, the second layer 124 is a noncontiguous layer that is discontinuous at the crossover plane P3 that demarcates the first region R1 and the second region R2. Accordingly, the second layer 124 has a first arm 124-1 in the first region R1 and a second arm 124-2 in the second region R2.

In the second stage S2 of the first region R1, the first arm 124-1 of the second layer 124 translates away from the center of the crossover adiabatic splitter 103, or rather, so that the first arm 124-1 of the second layer 124 translates toward a side. Specifically, in the second stage S2, the first arm 124-1 of the second layer 124 translates so that, at the crossover plane P3, the first arm 124-1 of the second layer 124 is positioned laterally outward of the outer edge 134 of the first layer 122 of the second waveguide 120. In some embodiments, at the crossover plane P3, the first arm 124-1 of the second layer 124 is spaced a lateral distance D2 that is equal to or greater than the width of the first layer 122 at the crossover plane P3.

In the third stage S3 of the second region R2, the second arm 124-2 of the second layer 124 is positioned at a side of the crossover adiabatic splitter 103 at the crossover plane P3, or more specifically, the side of the crossover adiabatic splitter 103 opposite the side to which the first arm 124-1 of the second layer 124 is positioned at the crossover plane P3. At the crossover plane P3, the second arm 124-2 is positioned laterally outward of an outer edge 138 of the first layer 112 of the first waveguide 110. In some embodiments, at the crossover plane P3, the second arm 124-2 of the second layer 124 is spaced a lateral distance D3 that is equal to or greater than the width of the first layer 112 at the crossover plane P3. From its position at the crossover plane P3, the second arm 124-2 of the second layer 124 inverse tapers in a non-linear manner and translates laterally inward toward the first layer 112 of the first waveguide 110. Specifically, the second arm 124-2 of the second layer 124 translates to cross the outer edge 138 of the first layer 112 of the first waveguide 110 and inverse tapers to eventually match the width of the first layer 112 of the first waveguide 110 (eventually matching in width at the second region plane P4). The arrangement of the first arm 124-1 and the second arm 124-2 advantageously remove or greatly reduce the risk of scattering, particularly at the crossover plane P3. Also, such an arrangement can be useful where a minimum manufacturable tip width (or arm width) is relatively large.

Although the inventive aspects were described herein with reference to an adiabatic splitter having a single layer waveguide and a bilayer waveguide, the inventive aspects of the present disclosure are applicable to adiabatic splitters having at least two waveguides, wherein one waveguide has at least one more layer than the other waveguide. Further, although the inventive aspects were described herein with reference to a 2×2 adiabatic splitter, the inventive aspects of the present disclosure are applicable to adiabatic splitters having more than two waveguides, such as adiabatic splitters with four waveguides. In addition, although the inventive aspects were described herein with reference to an adiabatic splitter configured with a 50:50 split ratio, the inventive aspects of the present disclosure are applicable to adiabatic splitters having other split ratios.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An adiabatic splitter, comprising:

a first waveguide; and a second waveguide spaced from the first waveguide by a gap, the second waveguide has a first layer and a second layer, wherein, in a first stage of the adiabatic splitter, the first and second waveguides converge toward one another and the first and second layers of the second waveguide are in a stacked arrangement, and wherein, in a second stage of the adiabatic splitter, the second layer of the second waveguide tapers and translates so that the first and second layers of the second waveguide are, at least at an output of the adiabatic splitter, no longer in the stacked arrangement, and wherein the second layer of the second waveguide translates toward a center of the adiabatic splitter along the second stage.

2. The adiabatic splitter of claim 1, wherein the first layer of the second waveguide and the second layer of the second waveguide have a same width along the first stage.

3. The adiabatic splitter of claim 1, wherein a width of the first layer of the second waveguide remains substantially constant along the second stage.

4. The adiabatic splitter of claim 1, wherein the first waveguide has a first layer, and wherein a width of the first layer of the first waveguide inverse tapers along the first stage and remains substantially constant along the second stage.

5. The adiabatic splitter of claim 1, wherein at the output of the adiabatic splitter, the second layer of the second waveguide is positioned between the first waveguide and the first layer of the second waveguide.

6. The adiabatic splitter of claim 1, wherein, at the output of the adiabatic splitter, the second layer of the second waveguide is spaced a lateral distance that is equal to or greater than a width of the first layer of the second waveguide.

7. The adiabatic splitter of claim 1, wherein the second layer of the second waveguide tapers in a non-linear manner along the second stage.

8. The adiabatic splitter of claim 1, wherein the first waveguide and the first layer of the second waveguide have a substantially constant edge-to-edge separation along the second stage.

9. The adiabatic splitter of claim 1, wherein the second layer of the second waveguide is spaced vertically from the first layer of the second waveguide by a silicon oxide layer.

10. The adiabatic splitter of claim 1, wherein the second layer of the second waveguide is positioned directly adjacent the first layer of the second waveguide.

11. The adiabatic splitter of claim 1, wherein the adiabatic splitter has a first region and a second region, the first region has the first stage and the second stage and the second region has a third stage and a fourth stage, and wherein, in the third stage, the second layer of the second waveguide inverse tapers and translates so as to be positioned, at least in part, in a stacked arrangement with a first layer of the first waveguide, and wherein, in the fourth stage, the first layer of the first waveguide and the first layer of the second waveguide diverge from one another and the first layer of the first waveguide and the second layer of the second waveguide have a same width and traverse through the fourth stage in the stacked arrangement commenced in the third stage.

12. A crossover adiabatic splitter, comprising:

a first region;

a second region;

a first waveguide traversing through the first region and the second region; and a second waveguide traversing through the first region and the second region, and wherein:

i) in the first region, the first waveguide has a first layer and the second waveguide has a first layer and a second layer, the first waveguide and the second waveguide converge toward one another over a first stage of the first region and the second layer and the first layer of the second waveguide traverse through the first stage in a stacked arrangement, and in a second stage of the first region, the second layer of the second waveguide tapers and translates toward a center of the crossover adiabatic splitter, and ii) in the second region, the second layer of the second waveguide inverse tapers and translates over a third stage of the second region, and in a fourth stage of the second region, the first layer of the first waveguide and the first layer of the second waveguide diverge from one another and the second layer of the second waveguide and the first layer of the first waveguide traverse through the fourth stage in a stacked arrangement.

13. The crossover adiabatic splitter of claim 12, wherein, in the second stage, the second layer of the second waveguide tapers in width and translates to cross an inner edge of the first layer of the second waveguide, and wherein, in the third stage, the second layer of the second waveguide inverse tapers in width and translates to cross an inner edge of the first layer of the first waveguide.

14. The crossover adiabatic splitter of claim 12, wherein the second layer of the second waveguide is a contiguous layer that extends continuously through the first and second regions.

15. The crossover adiabatic splitter of claim 13, wherein the second layer is a contiguous layer that extends continuously through the first and second regions.

16. An adiabatic splitter, comprising:

a first waveguide; and a second waveguide spaced laterally from the first waveguide by a gap, the second waveguide has a first layer and a second layer, with the first and second layers of the second waveguide in a vertically stacked arrangement, the first and second waveguides laterally converge toward one another over a first portion of a longitudinal length of the adiabatic splitter, and over a second portion of the longitudinal length of the adiabatic splitter, the second layer of the second waveguide tapers in width and translates toward a center of the adiabatic splitter so as to laterally cross an inner edge of the first layer of the second waveguide.

* * * * *